US006041908A

United States Patent [19]

Delmenico et al.

[11] Patent Number: 6,041,908

[45] Date of Patent: Mar. 28, 2000

[54] VENDING MACHINE COIN TRANSPORTING DEVICE

[75] Inventors: Peter Delmenico; William R. George, both of Evanston, Ill.

[73] Assignee: Antares Applied Research, Inc., Evanston, Ill.

[21] Appl. No.: 09/038,436

[22] Filed: Mar. 11, 1998

[51] Int. Cl.[7] .............................. G07F 1/04; B65G 11/12

[52] U.S. Cl. ............................................ 194/348; 193/2 A

[58] Field of Search .................................... 194/348, 344; 193/DIG. 1, 2 A

[56] References Cited

U.S. PATENT DOCUMENTS

| | | | |
|---|---|---|---|
| 931,847 | 8/1909 | Dean et al. . | |
| 1,900,039 | 3/1933 | Brandt | 193/DIG. 1 |
| 2,057,737 | 10/1936 | Patzer . | |
| 2,179,023 | 11/1939 | Schauweker . | |
| 4,165,802 | 8/1979 | Mathews | 194/344 |
| 4,230,213 | 10/1980 | Spring . | |
| 4,306,644 | 12/1981 | Rockola et al. . | |
| 4,346,798 | 8/1982 | Agey, III . | |
| 5,027,937 | 7/1991 | Parish et al. | 194/348 |
| 5,127,507 | 7/1992 | McDermott | 193/2 A |

FOREIGN PATENT DOCUMENTS

| | | | |
|---|---|---|---|
| 2-76092 | 3/1990 | Japan | 194/348 |

*Primary Examiner*—Robert P. Olszewski
*Assistant Examiner*—Bryan Jaketic
*Attorney, Agent, or Firm*—McDonnell Boehnen Hulbert & Berghoff

[57] ABSTRACT

A coin handling mechanism for conveying coins to a remotely positioned coin receptor which accumulates the deposited coins. There is a liquid diverter within the mechanism for directing the flow of liquid injected through the coin entrance slot downwardly along the back of the housing to a fluid collecting chamber. A plurality of ribs at the back of the housing form channels for directing the flow of the fluid along the back of the housing. There is also provided a coin discharge chute having an adjustment mechanism to adjust the point of discharge of the coins. This compensates for variances in various vending machines and positions the coin discharge chute properly with respect to the coin receptor.

27 Claims, 6 Drawing Sheets

VENDING MACHINE COIN TRANSPORTING DEVICE

FIELD OF THE INVENTION

This invention relates to coin receiving devices for use on vending machines, and more particularly, to a coin handling mechanism which diverts liquid from the coin entrance slot and keeps the liquid from entering the coin receptor. Furthermore, the mechanism includes provisions for providing an adjustable diverter mechanism at the output of the coin handling mechanism such that the coins can be accurately deposited into the coin receptor.

BACKGROUND OF THE INVENTION

There has existed a need for a reliable method for conveying coins from an entry point or slot on the front of a vending machine to a coin counting and validation mechanism located within the machine. This is normally accomplished with a device such as a coin chute, which usually consist of two or more plastic parts, bolted inside the vending machine door. Coin chutes used for this specific purpose have two openings. The first is located next to the entry slot on the vending machine to receive coins inserted by a customer. The second aperture is at the discharge end of the coin chute which is normally located just above the entry point to an electromechanical coin sorting, counting and storing device, generally called a coin receptor. Thus, the primary responsibility of the coin chute is to reliably convey coins from their point of insertion at the coin receiving slot to the discharge end located adjacent to the coin receptor. In the past, there has not been any adjustment mechanism to adjust the discharge end of the coin chute to allow for any adjustment and direction of the coin as it is discharged from the coin chute.

Another problem has developed with respect to vandals pouring or injecting a liquid, commonly salt water, into the coin chute. Generally, this is done by squirting the salt water into the coin entrance slot or aperture of the vending machine. In the past, the salt water would run down the coin chute and drip into the coin receptor. The salt water causes the coin counting and credit mechanisms to short circuit and malfunction. Often, this results in the vending machine discharging the improper amount or all of the merchandise. At other times, the shorted electrical circuits may cause money within the receptor to be dispensed through the change or coin return mechanism. Furthermore, the salt water can cause the receptor to be destroyed resulting in expensive repairs to the vending machine. Vandals also have a practice of sliding a flexible tube connected to a squeeze bottle down the coin chute. In this case, the salt water is injected very close to the coin receptor and often past the point of any anti-fluid feature.

Thus, there is a need for a coin chute for vending machines which diverts liquid which is injected into the coin entrance slot such that the liquid is diverted harmlessly away from the coin receptor. Furthermore, there is a need to provide an adjustment mechanism at the discharge end of the coin chute to minimize the possibility of coin jams from the coins not being properly aligned when they are discharged from the coin chute into the coin receptor.

In the past, no coin chute has ever been devised which provides adjustability of the coin discharge portion of the coin chute. Previously, the coin chute had its discharge end set in a predetermined position which was supposed to be in alignment with the receiving portion of the coin receptor. The problem was addressed by merely providing a funnel mechanism at the receptor to receive coins from the discharge end of the coin chute. However, this was not a satisfactory solution to the problem as the coin discharge chute did not always discharge the coins in a proper manner into the funnel such that the coins were received by the receptor. Furthermore, due to manufacturing tolerances of the components of a vending machine, and the variances between vending machine manufacturers, the coin discharge chute did not normally line up in the exact proper orientation with respect to the receptor such that jams will not occur.

Unlike the lack of inventions directed to an adjustable coin discharge chute, the prior art has addressed the problem of liquid diverters for vending machines. The earliest design for keeping liquid from the receptor is illustrated in U.S. Pat. No. 4,230,213 entitled “Liquid Rejecting Coin Chute”. This device used a very simple grate at the bottom of the coin chute to divert coins in one direction yet allow liquid to pass through the grate and be discharged into a trough. However, this device did not minimize splashing of the injected liquid if injected under pressure.

U.S. Pat. No. 4,306,644 entitled “Coin Chute for Vending Machine” is similar to the ’213 device in that the liquid is allowed to drop through a series of rib members which form an open bottom wall for the coin chute. The coins are deflected and the liquid passes through the ribs. Again, a shortcoming of this device is that it does not provide an effective means for draining away the fluid if it is injected under sufficient pressure.

Another liquid diverting device is illustrated in U.S. Pat. No. 4,346,798 entitled “Liquid Diverting Coin Hopper”. In this device, the liquid flows along a first slanted surface which transports both liquids and coins. A second slanted surface traveling in the opposite direction from the first, diverts the coins toward the coin receptor yet has a plurality of openings which permit liquid to flow through the second slanted surface and into a liquid retaining compartment. This device does not provide for a means to control a liquid sprayed under any pressure.

U.S. Pat. No. 5,027,937 entitled “Liquid Diverting Coin Chute” provides a plurality of openings along the front surface of the coin chute, which is the same surface on which the coins slide. This device assumes that the liquid will enter the coin chute at a low velocity such that it flows along the front surface of the chute. It does not provide for controlling liquid injected at a substantial pressure which, in fact, strikes the rear of the chute and doesn’t flow gently along the front surface of the chute.

None of the devices which are designed for liquid diversion will protect the coin receptor from the problem of the vandal inserting a flexible hose or tube down the coin chute. By manipulating the flexible tube, it can be placed past the location of the liquid diverting device. The prior art devices have not addressed this problem.

SUMMARY OF THE INVENTION

Applicants’ invention solves both the problem of providing a liquid diverting coin handling mechanism and also provides for adjustable means at the coin discharge end of the coin chute, so that coins will be directed accurately into the coin receptor. The invention comprises a housing having front, back and side walls with a coin receiving slot at the top of the housing. The housing is mounted to the door of a vending machine. There are a series of vertically disposed ribs at the back of the housing which are in substantially parallel alignment with each other. The ribs define liquid diverting channels which direct the flow of any liquid injected through the coin entrance slot downwardly along the rear wall of the housing to a fluid collecting chamber where it is discharged. There is also provided an adjustment mechanism on the exit portion of the coin chute to provide accurate alignment of the discharge of the coin chute with the entrance into the coin receptor.

Thus, it is an object of the invention to provide a coin handling mechanism for use on vending machines that safely redirects fluid injected into the coin entrance slot so that it will not enter the coin receptor. It is a related object to provide a coin handling mechanism which provides protection for the coin receptor from fluid, especially salt water, being injected into the coin handling mechanism. Yet another related object is to provide a coin handling mechanism which protects the coin receptor from electrical malfunctions as a result of fluid entering the coin receptor due to it being injected through the coin receiving slot.

Still another object is the object of providing a coin handling mechanism which redirects the flow of liquid injected through the coin receiving slot to the back wall of the coin handling mechanism where it can be safely and effectively diverted away from the coin receptor. Another object is to provide a coin handling mechanism that makes it difficult to insert and guide a flexible tube into the mechanism to a point beyond the fluid diverting apparatus.

Yet another object is the object of providing a coin handling mechanism which provides for an adjustable discharge chute such that it can be accurately positioned with respect to the coin receptor to minimize the likelihood of coin jams.

A related object to the improvements in the coin handling mechanism is the object of providing a coin handling mechanism which requires less maintenance and service calls, thereby resulting in lower operating expenses.

These and other objects and advantages will be apparent upon reading the description of the drawings and preferred embodiment of the invention.

DESCRIPTION OF THE PREFERRED EMBODIMENTS

Figure 1:
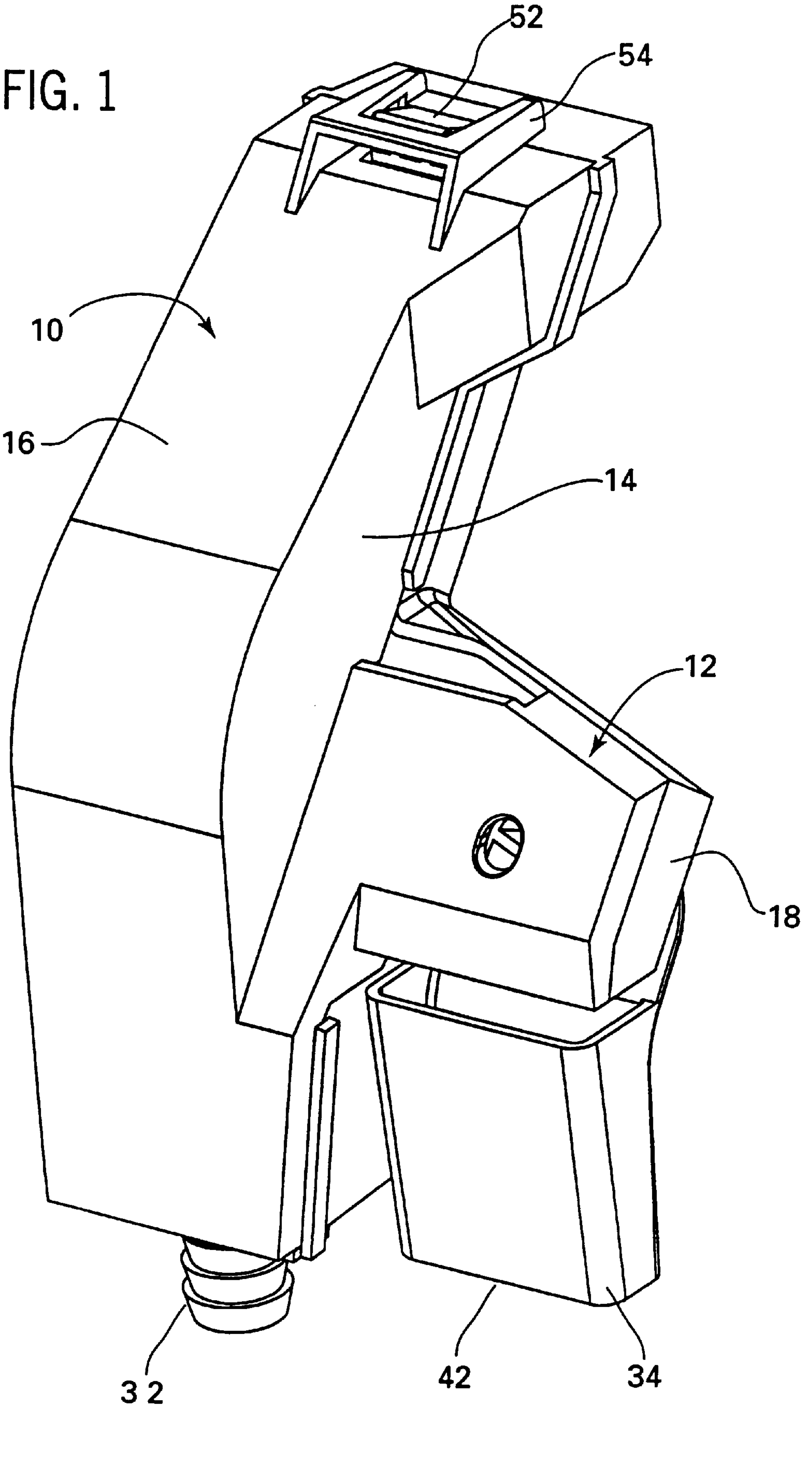
FIG. 1 is a perspective view of the coin handling mechanism as viewed from the inside of the vending machine looking toward the front door of the vending machine.

Turning first to FIG. 1 there is illustrated an inventive coin handling mechanism 10 embodying our unique design. It is comprised of a cover 12 having side walls 14 and 15, and a front wall 16.

Figure 2:
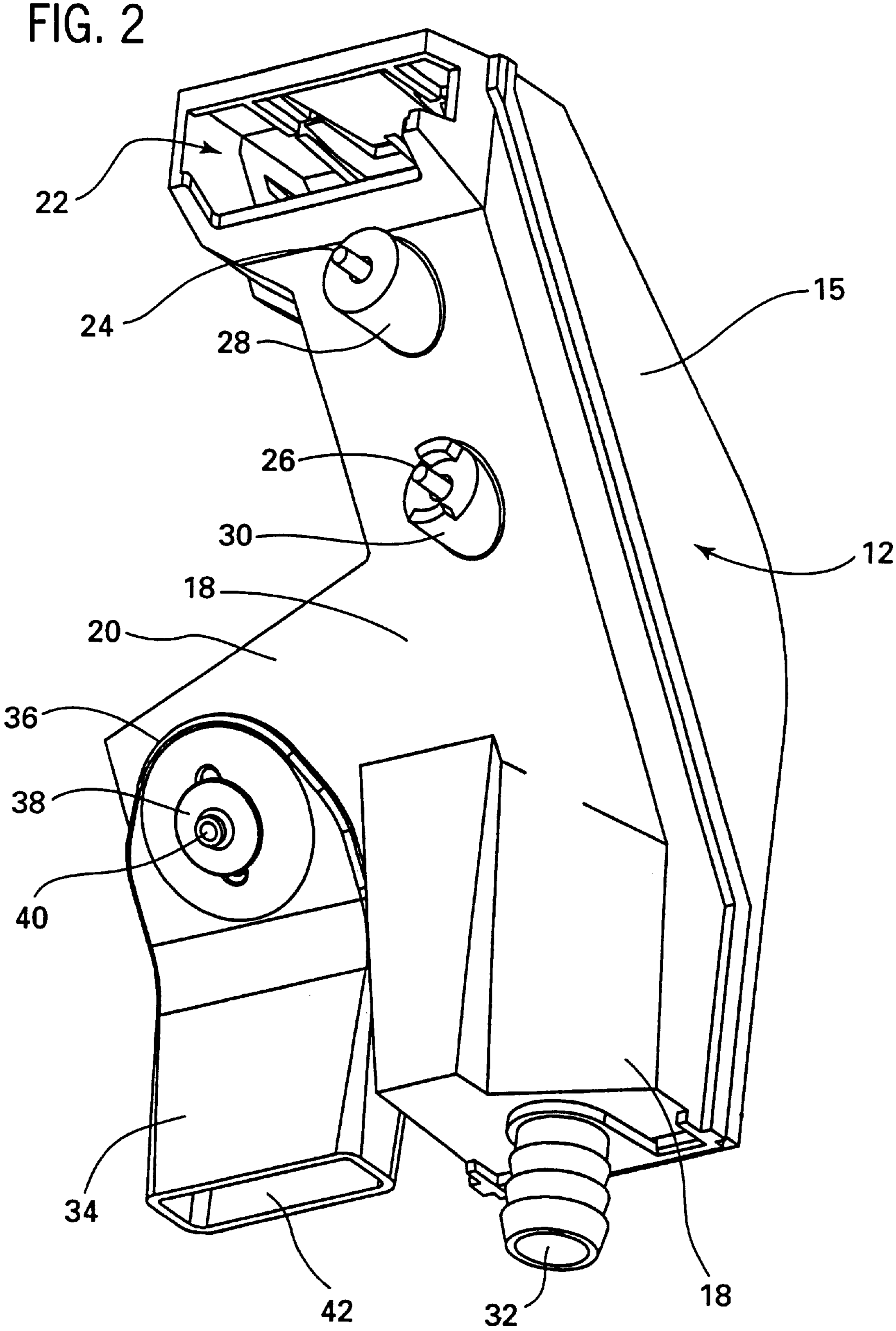
FIG. 2 is a perspective view of the coin handling mechanism as viewed looking toward the front door of the vending machine.

FIG. 2 illustrates the opposite side of the mechanism 10. There is a base 18 having a front wall 20. At the top of the base 18 is a coin receiving slot 22 at a top portion 23 of the base 18 through which the user of the vending machine deposits their coins generally with the coins in a horizontal plane. There are a pair of mounting screws 24, 26 which extend through the base 18 and into the rear of the front door of the vending machine (not illustrated). A pair of supports 28, 30 extend out from the base 18 in order to give structural support and stability to the base 18 when mounted against the vending machine door. At the bottom of the base 18 is a drain 32 which generally connects to a drain pipe or tube to dispel fluid collected within the coin handling mechanism 10.

There is also illustrated an inventive adjustable discharge chute 34 which is mounted to the base 18. A top mounting portion 36 of the discharge chute 34 is adjustably mounted to the base 18 by means of a clamp 38 and clamp fastener or screw 40. The adjustment mechanism will be more fully described later. There is also a discharge chute exit 42 disposed at the lower end of the discharge chute 34. In operation, it is important that the discharge chute exit 42 be aligned with the coin receptor (not illustrated) such that coins exiting the discharge chute 34 will drop into the receptor without interference from any other parts thus minimizing the possibility of coins jamming.

Figure 3:
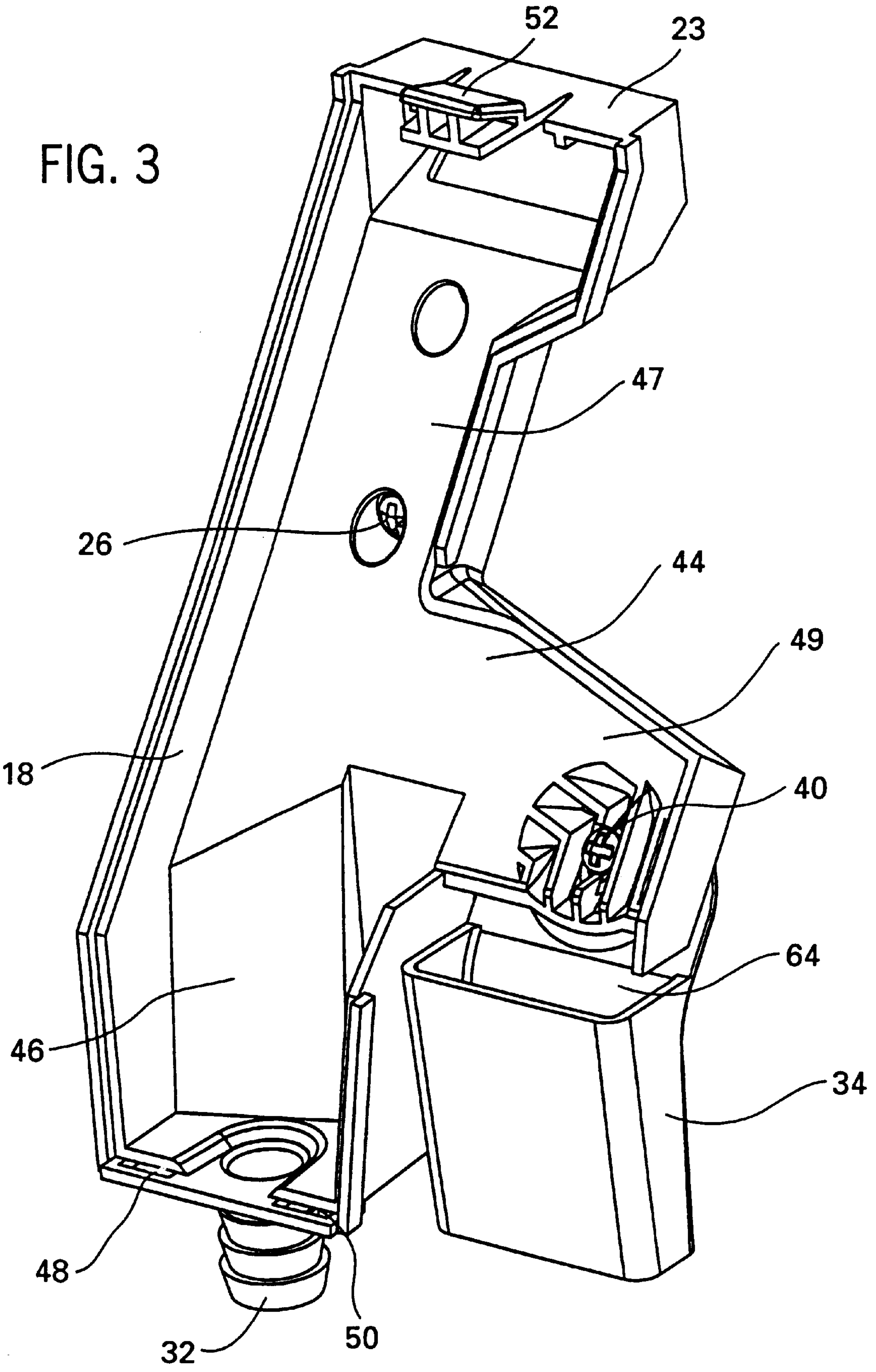
FIG. 3 is a perspective view of the coin handling mechanism taken from the same perspective as FIG. 1 with the cover of the coin handling mechanism removed exposing the base of the coin handling mechanism.

FIG. 3 illustrates the inside of the base 18 with the cover 12 removed. The base 18 has a back wall 44 which is a substantially smooth surface. The mounting screws or fasteners 24, 26 pass through this back wall and are received in the front door of the vending machine to hold the base 18 in place. There is a fluid collecting chamber 46 disposed at the lower portion of the base 18. There is a neck portion 47 extending from the coin receiving slot 22 to the fluid collecting chamber 46. Extending laterally from the neck portion 47 is an arm 49 through which coins are diverted to the discharge chute 34. There are also a pair of slots 48, 50 at the lower end of the base. The slots receive complementary tabs 51 located on the bottom of the cover 12 in a retaining relationship. A latch 52 at the top 23 of the base 18 is received by a complementary latch closure mechanism 54 which is disposed at the top of the cover 12. The perimeter of the cover 12 is designed to substantially align with and seal against the perimeter of the base 18. The tabs 51 and slots 48, 50 at the bottom of the cover 12 and base 18 respectively retain the bottoms of these two structures together while the latch 52 and latch closure mechanism 54 releasably hold the top of the device in a locked relationship until such time as the latch 52 is pivoted to release the cover 12 from the base 18. Thus, a very simple, economical, yet structurally sound closure mechanism is provided for these two pieces which form the housing of the coin handling mechanism 10.

Figure 4:
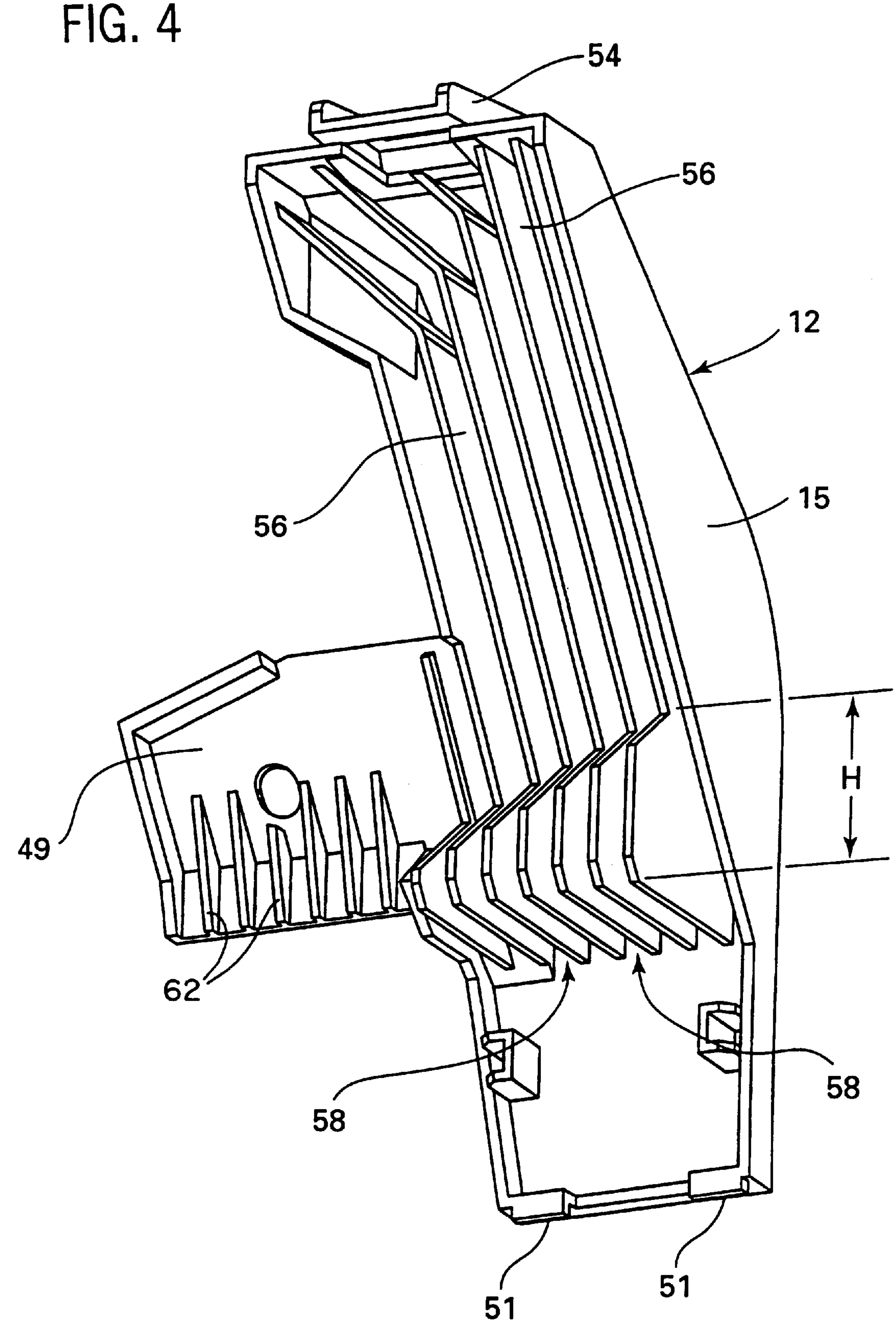
FIG. 4 is a perspective view of the inside of the cover of the coin handling mechanism.

FIG. 4 illustrates the unique inventive concept which diverts and directs the flow of any fluid injected into the coin receiving slot 22. Normally, when vandals try to squirt salt water into a vending machine, they use a squeeze bottle containing salt water. The nozzle of the squeeze bottle is inserted into the coin receiving slot 22 and the flexible walls of the bottle are squeezed, squirting the liquid into the slot 22. In prior art devices, this stream of fluid was turbulent inside the coin handling mechanism and often resulted in a portion of the liquid being discharged into the receptor. This is obviously undesirable in that it could short circuit the electrical components within the receptor causing the vending machine either to discharge its contents, discharge coins, or merely be ruined, causing an expensive service call and replacement of the receptor. In Applicants' device there are a series of ribs or partitions 56 extending in a plane perpendicular to the inside of the front wall 16 of the cover 12. The ribs 56 are preferably substantially parallel to each other although it is not critical that they are parallel. Channels 58 are formed between the ribs 56 and receive the fluid in such a manner as to break up the injected stream into separate streams which are received within the channels 58. This lessens the force of injected liquid and restricts movement of the stream of liquid so that it is very difficult, if not impossible, for the liquid to splash around in such a manner as to have a portion of the splashed liquid diverted into the receptor. Instead, the channels 58 direct the flow of liquid toward the inside surface of the front wall 16 of the cover 12. Surface tension assists in keeping the liquid attached to the ribs and within the channels so that the fluid will not drop off the ribs due to the effects of gravity but rather will flow along the ribs and inside surface of the cover down toward the fluid collecting chamber 46.

The ribs 56 also make it extremely difficult for vandals to slide a flexible tube connected to a squeeze bottle down into the mechanism beyond the neck portion 47. The ribs 56 tend to keep the flexible tube oriented vertically along the inside of the cover. Thus, any salt solution will be directed toward the fluid collecting chamber 46.

The configuration of the ribs is also unique. From the top 23 until a portion just above the fluid collecting chamber, the ribs are substantially of one height extending from the front wall 16. The height is selected so that when the cover 12 is snapped into engagement with the base 18, a slight gap exists between the top of the ribs 56 and the back wall of the base 44. This actually provides a thin passageway through which the coins will slide such that the surface of the coin will slide along a neck portion 47 along the back wall of the base 44 down toward the fluid collecting chamber 46. However, above the fluid collecting chamber 46, the ribs are of a greater height and, in fact, will be dimensioned to engage the back wall 44 of the base. This forms a stop and keeps the coins from dropping into the fluid collection chamber 46. As seen in FIG. 4, the height H of the protruding portion of each of the ribs decreases from the side wall 15 toward the arm portion 49 where they can be discharged into the discharge chute 34. In essence, this causes a sloping or tapering plane along the bottom portion of the ribs toward the arm portion. Thus, when the coins strike the bottom of the ribs, they will necessarily be diverted toward the arm portion 49. This function could also be accomplished by inserting a foraminous structure at the bottom of the ribs which, when properly dimensioned and angled, could accomplish the same purpose. However, for ease of manufacturing, it would be most economical to provide the varying height of the ribs as an integral part of the ribs themselves. The arm portion 49 of the cover 12 also has structural support ribs 62 which give structural support to the arm 49 and also act as guides for properly aligning the coins to be dropped into the chute 34.

The instant invention teaches away from the prior art in that the fluid is directed toward the back wall of the cover and within the channels 58. The prior art devices generally have any liquid directed along the neck portion 47 along with the coins. Both coins and liquid slide down toward the fluid collecting chamber 46 together. These devices operate under the assumption that both the coins and water will travel down the same surface. Our invention directs the flow of injected fluid to the back of the housing, not along the neck portion 47. This is the preferable direction for the fluid to flow rather than along the back wall 44 of the base 18. By manufacturing the cover 12 and base 18 from plastics with high surface energy, it will increase the effects of surface tension, with the result that fluids will tend to run along the ribs 56 down toward the fluid collecting chamber 56.

Figure 5:
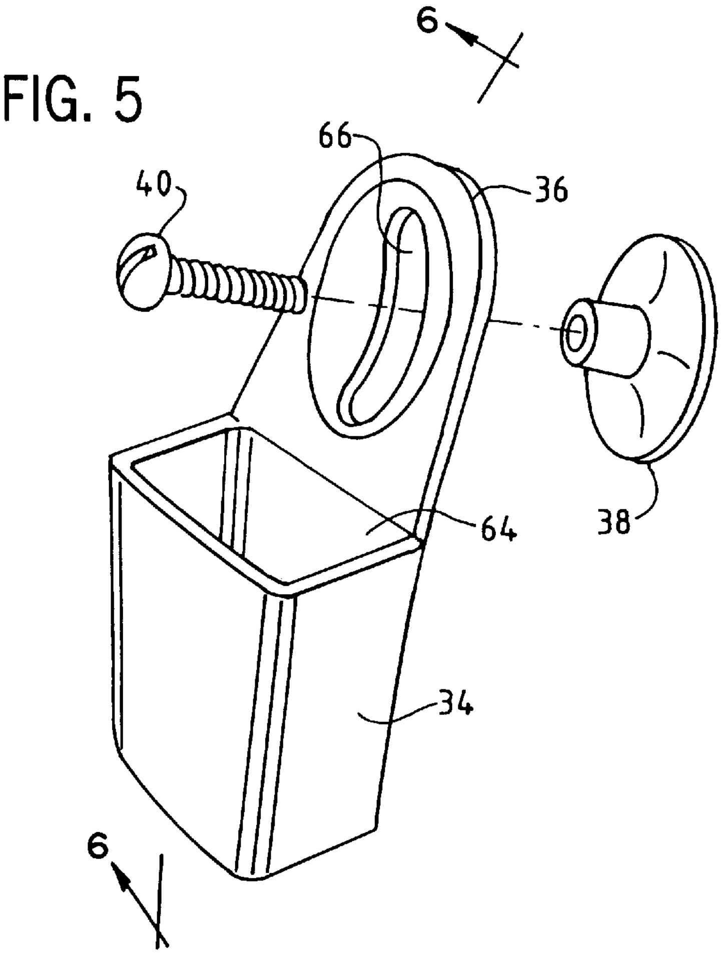
FIG. 5 is a perspective view of the adjustable discharge chute with its mounting means exploded from the discharge chute.

Another unique feature of the coin handling mechanism 10 is the adjustability of the discharge chute 34. Most discharge chutes in prior devices taper at their exit portions to limit the possible misalignment with the coin receptors. This tapering is often the cause of coin jams. As may be seen in FIGS. 5 and 6, the discharge chute 34 has a discharge chute entrance 64 which receives diverted coins discharged from the arm portion 49. By means of a unique adjustment mechanism, the discharge chute 34 and discharge chute exit 42 can be adjusted such that it can rotate and move vertically as seen in FIG. 7. With Applicants' invention, the chute exit 42 does not have to be tapered to allow for misalignment. The larger exit area 42 results in less possibility of a coin jam.

Figure 6:
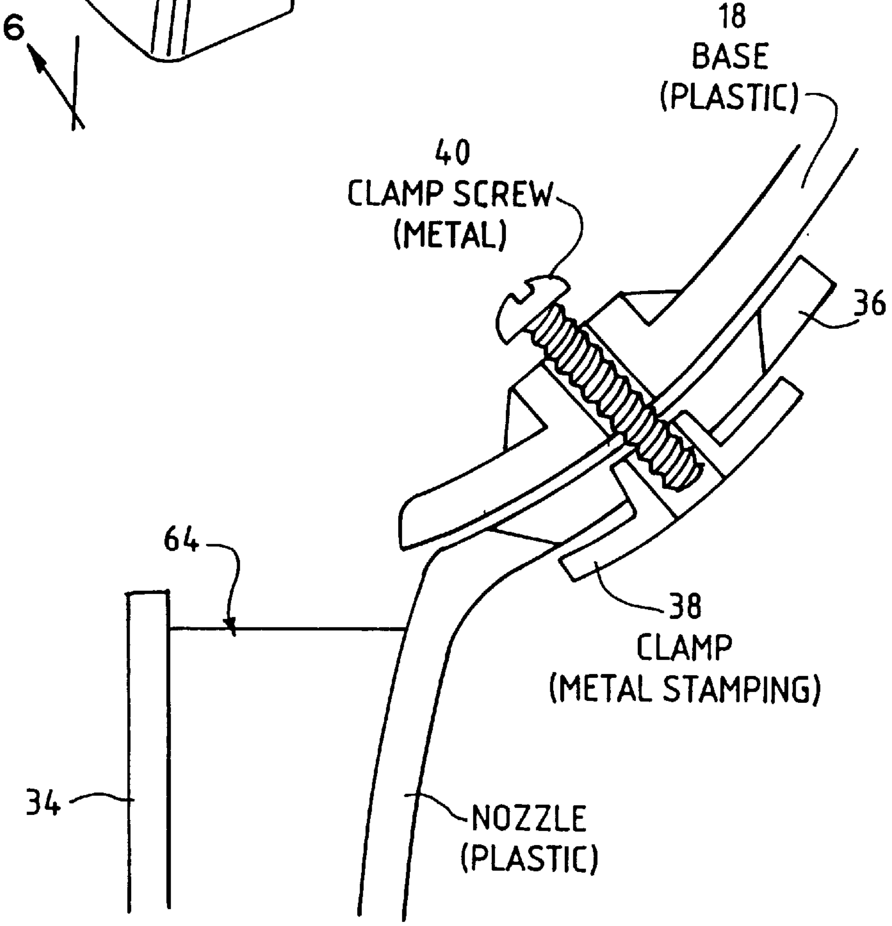
FIG. 6 is a cross sectional view of the discharge chute and mounting mechanism taken along line 6—6 of FIG. 5.
Figure 7:
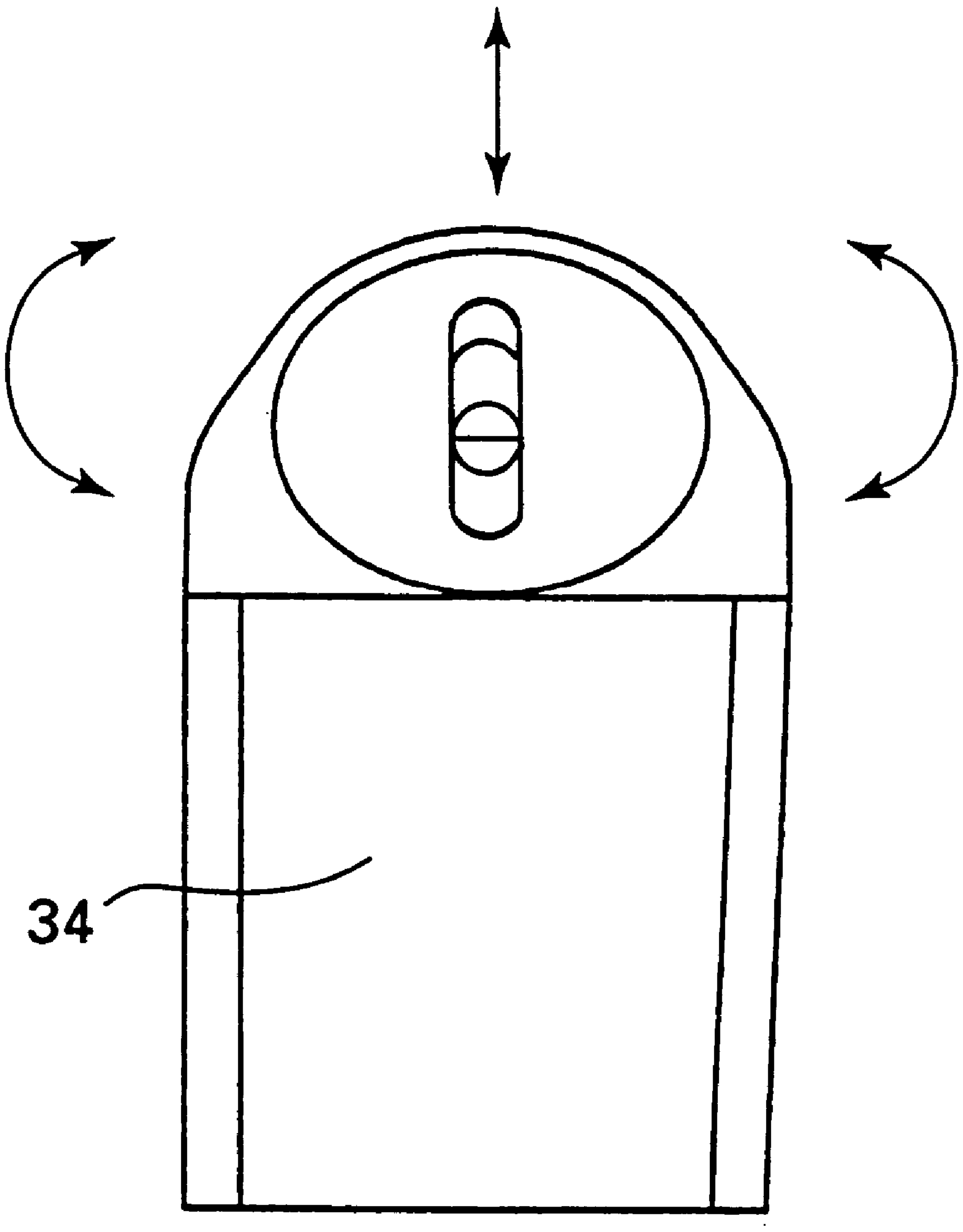
FIG. 7 is a view taken from the front of the vending machine facing toward the back of the vending machine showing the directions of adjustability of the discharge chute.

As best seen in FIG. 6, the clamp fastener or screw 40 passes through the base 18, through the top of the discharge chute 36 and into the clamp 38. By loosening the clamp screw 40, the top of the discharge chute 36 can move vertically up and down by means of the clamp member screw sliding within a slot 66 disposed in the top 36 of the discharge chute. The discharge chute 34 can rotate around the clamp screw 40 to move the discharge chute exit 42 laterally. This allows the discharge chute 34 to be accurately aligned with the coin receptor so that coins will be discharged directly into the receptor without the possibility of the coins jamming. By merely tightening the adjustment clamping screw 40, the position of the discharge chute 34 can be set and maintained. Due to the fact that there are numerous types of vending machines manufactured, and the tolerances of the manufacturers vary, along with the positioning of some of their components, it is advantageous to have the discharge chute 34 adjustable to compensate for these differences and tolerances of the various vending machines.

Although the adjustment and mounting mechanism for the discharge chute 34 is illustrated as a slot 66 within the top portion 36 of the discharge chute 34, it is evident that many different types of mechanical adjustment mechanisms could be implemented to provide adjustability in the orientation of the discharge chute 34 with respect to the coin handling mechanism 10. For example, a flexible plastic sleeve can connect the discharge chute 34 to the arm portion 49 of the base 18. The plastic sleeve retains the position to which it is moved to accurately position the discharge chute 34. Other types of pivots and slides can also be utilized to adjust the orientation of the discharge chute 34.

Thus, there has been presented a coin handling mechanism that fully satisfies the objects and advantages as set forth above. It is evident that many alternatives, modifications and variations will be apparent to those skilled in the art. Accordingly it is intended to embrace such variations as fall within the spirit and broad scope of the intended claims.

What is claimed is:

1. A liquid diverting coin handling mechanism for conveying coins to a remotely positioned coin receptor comprising:

a housing having a top, bottom, a front, a back, and side walls, a coin receiving slot disposed at the top and front of the housing, a coin discharge chute disposed in the housing below the coin receiving slot, coin directing means for conveying the coins from the coin receiving slot to the coin discharge chute, a plurality of ribs disposed at the back of the housing and extending along substantially an entire length of the back wall of the housing above a fluid collecting chamber, the ribs defining channels therebetween for directing the flow of liquid injected through the coin entrance slot downwardly along the back of the housing to the fluid collecting chamber, and drain means connected to the fluid collecting chamber for removing the fluid from the collecting chamber, wherein the discharge chute comprises an enclosed structure with an open top and open bottom, the area adjacent to the open top mounted to the housing, and wherein the discharge chute comprises a flexible tube having its top connected to the housing and its bottom disposed at the coin receptor whereby the coin receptor receives the coins passing through the discharge chute.

2. A liquid diverting coin handling mechanism for conveying coins to a remotely positioned coin receptor comprising:

a housing having a top, bottom, a front, a back, and side walls, a coin receiving slot disposed at the top and front of the housing, a coin discharge chute disposed in the housing below the coin receiving slot, coin directing means for conveying the coins from the coin receiving slot to the coin discharge chute, a plurality of ribs disposed at the back of the housing and extending along substantially an entire length of the back wall of the housing above a fluid collecting chamber, the ribs defining channels therebetween for directing the flow of liquid injected through the coin entrance slot downwardly along the back of the housing to the fluid collecting chamber, and drain means connected to the fluid collecting chamber for removing the fluid from the collecting chamber, wherein the ribs are of a uniform height, said height being greater than a width of the channels formed therebetween.

3. A liquid diverting coin handling mechanism for conveying coins to a remotely positioned coin receptor comprising:

a housing having a top, bottom, a front, a back, and side walls, a coin receiving slot disposed at the top and front of the housing, a coin discharge chute disposed in the housing below the coin receiving slot, coin directing means for conveying the coins from the coin receiving slot to the coin discharge chute, a plurality of ribs disposed at the back of the housing and extending along substantially an entire length of the back wall of the housing above a fluid collecting chamber, the ribs defining channels therebetween for directing the flow of liquid injected through the coin entrance slot downwardly along the back of the housing to the fluid collecting chamber, and drain means connected to the fluid collecting chamber for removing the fluid from the collecting chamber, further including a plurality of rib protrusions extending towards the front wall of said housing and forming a coin passageway between the ribs and the front of said housing, w herein the rib protrusions serve to support a coin as the coin passes through the coin passageway.

4. The coin handling mechanism of claim 3 wherein the ribs are of a uniform height, said height being greater than a width of the channels formed therebetween.

5. The coin handling mechanism of claim 3 wherein the discharge chute comprises an enclosed structure with an open top and open bottom, the area adjacent to the open top mounted to the housing.

6. The coin handling mechanism of claim 5 and further comprising adjustment mean for adjusting the orientation of the discharge chute to adjust the point of discharge of the coins.

7. The coin handling mechanism of claim 6 wherein the adjustment means comprises a pivot assembly connecting the discharge chute to the housing.

8. The coin handling mechanism of claim 5 wherein the discharge chute has an open top and an open bottom of substantially the same inside dimensions.

9. A coin handling mechanism for conveying coins to a remotely positioned coin receptor comprising:

a housing having a top, bottom, a front, a back and side walls, a coin receiving slot disposed at the top and front of the housing, a coin discharge chute disposed in the housing below the coin receiving slot, said discharge chute having an open top mounted to said housing and an open bottom, coin directing means within the housing for conveying the coins from the coin receiving slot to the coin discharge chute, and means for adjusting the position of the discharge chute to vary a relative distance or orientation between the bottom of the discharge chute and said housing to properly align the discharge chute with a coin receptor.

10. The coin handling mechanism of claim 9 wherein the discharge chute is comprised of a tubular member having a top and bottom portion, both the top and bottom portion being open to receive and discharge coins respectively.

11. The coin handling mechanism of claim 10 wherein the means for adjusting the position of the discharge chute comprises a pivotal connection joining the tubular member to the housing, the pivotal connection allowing the bottom portion to pivot about the pivotal connection.

12. The coin handling mechanism of claim 11 wherein the pivotal connection is a ball and socket pivot assembly.

13. The coin handling mechanism of claim 10 and further comprising a convex dish shaped top portion pivotally connected to the housing.

14. The coin handling mechanism of claim 13 and further comprising a slot in the dish shaped top portion to receive a fastener therein for connecting the top portion to the housing, the top portion movable with respect to the fastener allowing the bottom portion to pivot about the fastener and move vertically with respect to the housing.

15. The coin handling mechanism of claim 9 wherein the coin discharge chute comprises a funnel shaped structure with an open top and open bottom, and releasable mounting means for adjustably mounting the funnel shaped structure to the housing.

16. The coin handling mechanism of claim 9 and further comprising means for mounting the coin handling mechanism to the inside front door of a vending machine.

17. The coin handling mechanism of claim 9 wherein the discharge chute comprises a flexible tube having its top connected to the housing and its bottom disposed above a coin receptor whereby the coin receptor receives the coins passing through the discharge chute.

18. A liquid diverting coin handling mechanism for conveying coins to a remotely positioned coin receptor comprising:

a housing having a top, a bottom, a back, and side walls, a coin receiving slot disposed at the top and front of the housing, a coin discharge chute disposed at the top and front of the housing, a coin discharge chute disposed in the housing below the coin receiving slot, coin directing means for conveying the coins from the coin receiving slot to the coin discharge chute, a plurality of ribs disposed at the back of the housing and extending along substantially an entire length of the back wall of the housing above a fluid collecting chamber, the ribs defining channels therebetween for directing the flow of liquid injected through the coin entrance slot downwardly along the back of the housing to the fluid collecting chamber, and means for adjusting the position of the discharge chute to vary the location of discharge of the coins as they exit the discharge chute, wherein the coin discharge chute comprises a funnel shaped structure with an open top and open bottom, and releasable mounting means for adjustably mounting the funnel shaped structure to the housing, and further including a plurality of rib protrusions extending towards the front wall of said housing and forming a coin passageway between the ribs and the front wall of said housing, wherein the rib protrusions serve to support a coin as the coin passes through the coin passageway.

19. A liquid diverting coin handling mechanism for conveying coins to a remotely positioned coin receptor comprising:

a housing having a top, a bottom, a back, and side walls, a coin receiving slot disposed at the top and front of the housing, a coin discharge chute disposed at the top and front of the housing, a coin discharge chute disposed in the housing below the coin receiving slot, coin directing means for conveying the coins from the coin receiving slot to the coin discharge chute, a plurality of ribs disposed at the back of the housing and extending along substantially an entire length of the back wall of the housing above a fluid collecting chamber, the ribs defining channels therebetween for directing the flow of liquid injected through the coin entrance slot downwardly along the back of the housings to the fluid collecting chamber, and means for adjusting the position of the discharge chute to vary the location of discharge of the coins as they exit the discharge chute, wherein the ribs are of a uniform height, said height being greater than a width of the channels formed therebetween.

20. A liquid diverting coin handling mechanism for conveying coins to a remotely positioned coin receptor comprising:

a housing having a top, a bottom, a back, and side walls, a coin receiving slot disposed at the top and front of the housing, a coin discharge chute disposed at the top and front of the housing, a coin discharge chute disposed in the housing below the coin receiving slot, coin directing means for conveying the coins from the coin receiving slot to the coin discharge chute, a plurality of ribs disposed at the back of the housing and extending along substantially an entire length of the back wall of the housing above a fluid collecting chamber, the ribs defining channels therebetween for directing the flow of liquid injected through the coin entrance slot downwardly along the back of the housing to the fluid collecting chamber, and means for adjusting the position of the discharge chute to vary the location of discharge of the coins as they exit the discharge chute, further including a plurality of rib protrusions extending towards the front wall of said housing and forming a coin passageway between the ribs and the front wall of said housing, wherein the rib protrusions serve to support a coin as the coin passes through the coin passageway.

21. The coin handling mechanism of claim 20 wherein the ribs are of a uniform height, said height being greater than a width of the channels formed therebetween.

22. The coin handling mechanism of claim 20 wherein the discharge chute comprises an enclosed structure with an open top and open bottom, the area adjacent to the open top mounted to the housing.

23. The coin handling mechanism of claim 20 wherein the discharge chute is comprised of a tubular member having a top and bottom portion, both the top and bottom portion being open to receive and discharge coins respectively.

24. The coin handling mechanism of claim 23 wherein the means for adjusting the position of the discharge chute comprises a pivotal connection joining the tubular member to the housing, the pivotal connection allowing the bottom portion to pivot about the pivotal connection.

25. The coin handling mechanism of claim 24 wherein the pivotal connection is a ball and socket pivot assembly.

26. The coin handling mechanism of claim 23 and further comprising a convex dish shaped top portion pivotally connected to the housing.

27. The coin handling mechanism of claim 26 and further comprising a slot in the dish shaped top portion to receive a fastener therein for connecting the top portion to the housing, the top portion movable with respect to the fastener allowing the bottom portion to pivot about the fastener and move vertically with respect to the housing.

* * * * *